United States Patent
Andrews

(10) Patent No.: US 7,571,640 B2
(45) Date of Patent: Aug. 11, 2009

(54) MISFIRE DETECTION IN ENGINES FOR ON-BOARD-DIAGNOSTICS

(75) Inventor: Eric B. Andrews, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 110 days.

(21) Appl. No.: 11/692,875

(22) Filed: Mar. 28, 2007

(65) Prior Publication Data

US 2008/0236262 A1    Oct. 2, 2008

(51) Int. Cl.
*G01M 15/11* (2006.01)

(52) U.S. Cl. .................. 73/114.07; 73/114.75

(58) Field of Classification Search .......... 73/114.02, 73/114.06, 114.07, 114.69, 114.71, 114.75
See application file for complete search history.

(56) References Cited

U.S. PATENT DOCUMENTS

| | | | |
|---|---|---|---|
| 5,231,869 A * | 8/1993 | Klenk et al. ............. 73/114.08 |
| 5,239,473 A | 8/1993 | Ribbens et al. |
| 5,353,636 A * | 10/1994 | Sakurai et al. ............ 73/114.11 |
| 5,387,253 A | 2/1995 | Remboski, Jr. et al. |
| 5,421,196 A * | 6/1995 | Angermaier et al. ...... 73/114.02 |
| 5,567,873 A | 10/1996 | Toyoda |
| 5,687,082 A | 11/1997 | Rizzoni |
| 5,706,652 A | 1/1998 | Sultan |
| 6,003,307 A | 12/1999 | Naber et al. |
| 6,415,656 B1 | 7/2002 | Bidner et al. |
| 6,901,747 B2 | 6/2005 | Tashiro et al. |
| 6,978,666 B1 | 12/2005 | Wu et al. |
| 6,980,903 B2 | 12/2005 | Daniels et al. |
| 7,006,912 B2 | 2/2006 | Ralston |
| 7,292,933 B2 * | 11/2007 | Christensen ................. 701/111 |
| 2006/0101902 A1 * | 5/2006 | Christensen ................. 73/116 |

* cited by examiner

*Primary Examiner*—Eric S McCall
(74) *Attorney, Agent, or Firm*—J. Bruce Schelkopf; L. Scott Paynter; Kreig DeVault LLP

(57) ABSTRACT

Detection of cylinder misfires in engines. In one aspect of the invention, a method for detecting a cylinder misfire in an engine includes monitoring a temperature in the exhaust of the engine. Vibration of the engine is analyzed to identify a misfiring cylinder in the engine if the monitored temperature indicates a misfire may have occurred.

26 Claims, 3 Drawing Sheets

MISFIRE DETECTION IN ENGINES FOR ON-BOARD-DIAGNOSTICS

FIELD OF THE INVENTION

The present invention relates to engine diagnostics, and more particularly to on-board-diagnostic misfire detection in engines.

BACKGROUND OF THE INVENTION

On-Board Diagnostics (OBD) is a computer-based system built into more recent light-duty cars and trucks. OBD monitors the performance of some of the major components of a vehicle engine, including individual emission controls. The diagnostics system can provide vehicle owners or users with an early warning of malfunctions by way of a dashboard indicator, such as a "Check Engine" light (also known as a Malfunction Indicator Light (MIL)). By providing this warning, OBD allows the early identification of potential problems in the engine before the problems increase in severity. Modern OBD implementations provide realtime data in addition to recording appropriate codes from a standardized series of diagnostic trouble codes (DTCs), which allow a technician or other user to rapidly identify and remedy malfunctions in vehicle systems.

One of the more difficult diagnostics for engines is misfire detection. A misfire of an engine cylinder can be caused by a variety of sources, such as little or no fuel available (no injection), no atomization of the fuel (e.g., caused by the tip of an injector breaking off), loss of compression, incorrect timing of a spark plug for that cylinder, or other malfunctions. Automobiles can run a misfire diagnostic test to check for misfires. For example, many current Chrysler products have an active misfire algorithm This algorithm slowly over-fuels one injector at a time and looks for an equivalent engine speed increase. This algorithm is viable in these products because of the limited vehicle configurations that are used, e.g., one manual transmission configuration and one automatic transmission configuration are produced. This requires only a very small number of different calibrations to be needed for the algorithm for each different configuration.

However, such active misfire algorithms (speed-based misfire detection methods) are not appropriate for more specialized vehicles and engines, for example those used in heavy duty applications. This is due to the variation in configurations and applications, including different driveline inertias, transmission types, accessory loads, etc. Speed-based methods can be very complex due to the wide variety of driveline configurations and accessory loads, and such methods can require unique calibrations for each application (different combinations of transmission, driveline, and accessory loads). All of the different variations needed for different applications and configurations would require individual calibrations if the active misfire algorithm were used.

Knock sensors (accelerometers) are used on passenger cars for detection and control of engine knocking. However, detecting misfires using only knock sensors is not a viable alternative, since variations in engine mounting can cause changes in signal quality and significant calibration effort would be required to tune an algorithm to robustly detect misfires at all engine conditions. In addition, besides engine mounting issues, other characteristics can add noise to calibration and vibration detection, including driveline dynamics and accessory loads on the engine (e.g., a hydraulic pump, water pump, etc.).

Accordingly, a system and method that can diagnose engine misfires robustly and that can accommodate a wide variety of different configurations and applications in vehicle and engines without extensive calibrations would be desirable in many applications,

SUMMARY OF THE INVENTION

The invention of the present application relates to detection of cylinder misfires in engines. In one aspect of the invention, a method for detecting a cylinder misfire in an engine includes monitoring a temperature in the exhaust of the engine. Vibration of the engine is analyzed to identify a misfiring cylinder in the engine if the monitored temperature indicates a misfire may have occurred. A similar aspect is provided for a computer readable medium including program instructions for implementing similar features.

In another aspect of the invention, a system for detecting a cylinder misfire in an engine includes one or more sensors operative to sense a temperature in the exhaust of the engine, and an accelerometer coupled to the engine and operative to detect vibration of the engine. A controller is operative to monitor the sensed temperature and to examine the vibration of the engine to identify a misfiring cylinder in the engine, where the controller examines the vibration if the monitored temperature indicates a misfire may have occurred.

In another aspect of the invention, an engine system includes an engine, and one or more sensors which sense a temperature at a catalyst, where the catalyst is coupled to the engine and receives the exhaust from the engine. An accelerometer is coupled to the engine and detects vibration of the engine and provides vibration data. A controller is included to monitor the sensed temperature and to examine the vibration of the engine to identify a misfiring cylinder in the engine, where the vibration is examined if the monitored temperature indicates a misfire may have occurred. The examination includes examining a portion of the vibration data corresponding to an expected combustion event of a cylinder of the engine and comparing the portion to a different portion of the vibration data corresponding to no combustion event of any cylinder of the engine.

The present invention provides efficient cylinder misfire detection in an engine. The misfire detection can be performed without major calibration or adjustment regardless of the configuration or application of the engine or vehicle, and thus allows calibration time and effort to be saved over previously-used misfire detection methods, and is more robust than those methods.

DETAILED DESCRIPTION

The present invention relates to engine diagnostics, and more particularly to on-board-diagnostic misfire detection in engines. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular components provided in particular implementations. However, one of ordinary skill in the art will readily recognize that this apparatus will operate effectively in other implementations and applications. For example, the systems usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1-4 in conjunction with the discussion below.

Figure 1:
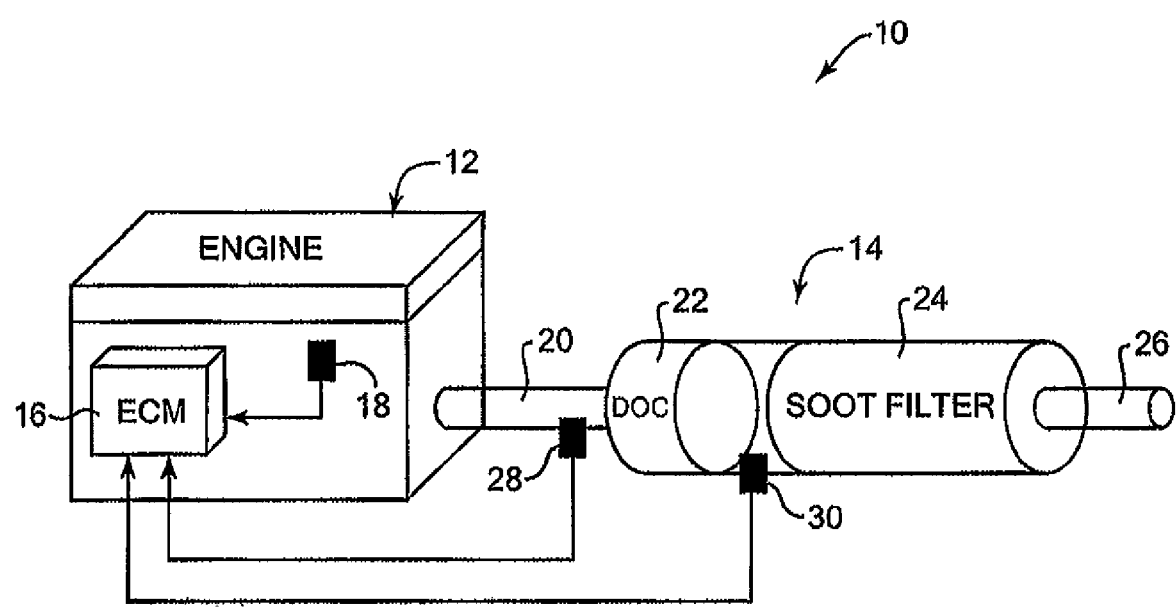
FIG. 1 is a block diagram of an engine system for use with the present invention.

FIG. 1 is a block diagram showing an engine system 10 of the present invention. The engine system 10 can be provided in any suitable vehicle, such as an automobile, truck, construction vehicle, etc., for providing work which can be translated to motion for moving the vehicle. In the described embodiment, engine system 10 is a diesel engine system, using diesel fuel to operate. Other embodiments can be used in other types of engine systems, such as natural gas engines, etc. In still other embodiments, the engine system 10 can be used in other, non-vehicle applications as appropriate, such as power generation, etc.

Engine system 10 includes an engine 12 and a particulate filter system 14. Engine 12 includes an engine control module (ECM) 16, which is an electronic control unit embedded in an engine that controls various aspects of an internal combustion engine's operation. For example, one or more ECMs can control the quantity of fuel injected into each cylinder each engine cycle, ignition timing, variable cam timing (VCT), and other functions or peripherals. The ECM 16 can include a microprocessor or other circuitry that allows it to be used as a "controller" or computer suitable for use with the present invention. The controller can be implemented using software (program instructions or code), or in hardware devices (logic gates, etc.), or in both software and hardware.

The misfire detection of the present invention can work alongside or in conjunction with an OBD fuel system monitor (not shown in FIG. 1) typically included in an engine system, and which isolates engine faults different from the misfires detected by the present invention, such as timing shifts and quantity of fuel injection.

An accelerometer 18 is included in the engine 12 and has an output that provides input to the ECM 16. The accelerometer 18 is preferably a low-cost device that can sense vibration caused by diesel combustion events in the engine system 10. The accelerometer 18 can be of any suitable type. The output signal of the accelerometer 18 is provided as the input signal to the ECM 16 and this signal can provide vibration data indicative of the amount of vibration in the engine 12.

Particulate filter system 14 includes a flow-through oxidation catalytic converter coupled to the engine 12 by an inlet 20 which receives the exhaust stream from the engine 12. Filter system 14 includes a diesel oxidation catalyst (DOC) 22 which uses a chemical process to break down pollutants in the exhaust stream into less harmful components. For example, the catalyst 22 can include a porous ceramic honeycomb-like structure that is coated with a material (such as a catalytic precious metal) that catalyzes a chemical reaction with the exhaust stream to reduce pollution in the stream. For example, in a diesel engine embodiment, the catalyst uses excess oxygen in the exhaust gas stream to oxidize carbon monoxide to carbon dioxide, and hydrocarbons to water and carbon dioxide. Other types of catalysts can be used in other embodiments.

The exhaust stream from engine 12 passes through the DOC 22 and is received by a soot filter (diesel particulate filter) 24 included in the particulate filter system 14. Soot emissions from the operation of a diesel engine are not affected by the DOC 22 and so can be contained by the filter 24. The filtered exhaust stream is output via an outlet 26, and is at some point released to the exterior environment.

System 10 also includes temperature sensors 28 and 30. Temperature sensor 28 is coupled to the inlet 20 to the particulate filter system 14 and measures the temperature at that location, while temperature sensor 30 is coupled to the output of the DOC 22 and measures the temperature at that location. Each temperature sensor 28 and 30 provides a signal indicative of the sensed temperature to the ECM 16 of the engine 12. Thus, by comparing the sensed temperatures at each sensor 28 and 30, the increase in temperature in the DOC 22 exhaust output caused by the DOC 22 can be determined. This is used in the misfire detection method of the present invention, as described in greater detail below with respect to FIGS. 2 and 3.

Figure 2:
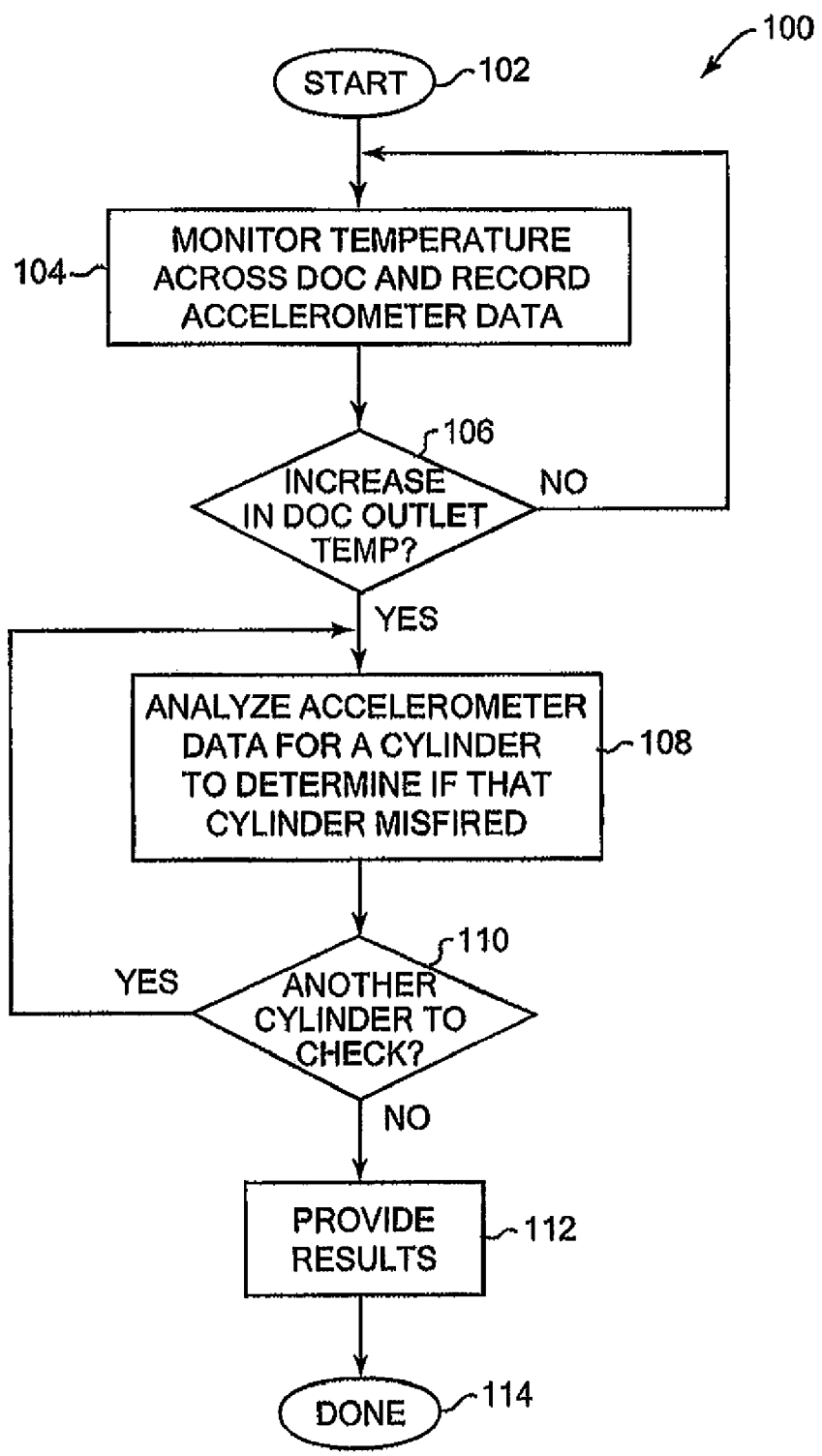
FIG. 2 is a flow diagram of a method of the present invention for detecting misfires in engines.

FIG. 2 is a flow diagram illustrating a method 100 of the present invention for detecting misfires of cylinders in an engine. This method can be implemented, for example, using the components described above with reference to FIG. 1, as controlled by the ECM 16, or other suitable controller in the system. Method 100 can be implemented by program instructions of software which can be stored on a computer readable medium, such as memory, hard drive, other magnetic disk, optical disk (CD-ROM, DVD-ROM), etc. Alternatively, some or all of method 100 can be implemented using hardware (logic gates, etc.), or a combination of software and hardware.

In one intended use, the misfire detection method 100 is continuously running during normal engine operation to detect misfires. In other uses, the method 100 can be initiated during a diagnostic test of the engine system, during which engine operations are actively tested and specific tests are run. This diagnostic test can be performed during normal engine operation or during testing operation. For example, method 100 can be initiated after an OBD fuel system monitor detects a fuel-related failure in a vehicle or other apparatus using the engine system. In other embodiments, the misfire detection method of the present invention can be used in other contexts.

The method begins at 102, and in step 104, the temperature in the exhaust stream, which is the temperature across the DOC 22 in the described embodiment, is monitored and vibrations in the engine are sensed by the accelerometer 18. This step can be performed continuously, or alternatively over a predetermined period of time. In the example embodiment of FIG. 1, the temperature is monitored using two temperature sensors 28 and 30, which are positioned before and after the DOC 22 in the exhaust stream of the engine 12.

Figure 3:
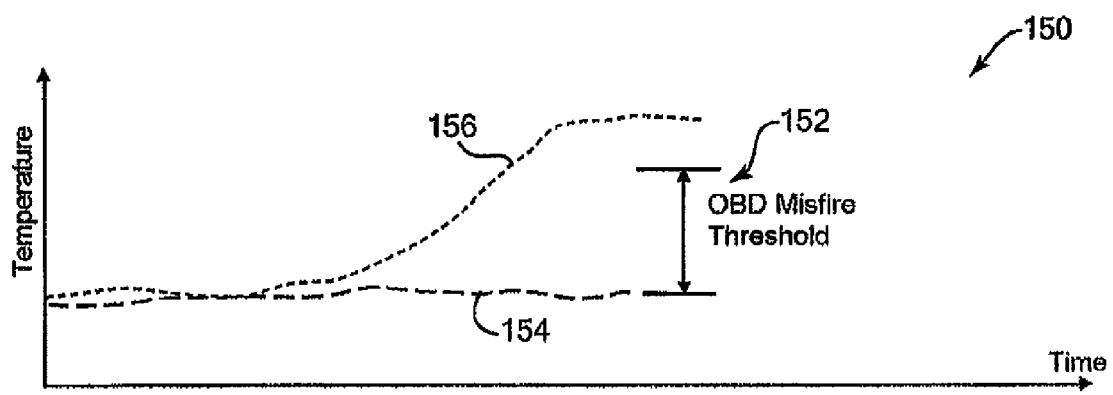
FIG. 3 is a graph diagram illustrating a temperature at the temperature sensors used in the present invention.

A misfiring cylinder in engine 12 will produce high levels of hydrocarbons in the exhaust of the engine. The hydrocarbons are oxidized across the catalyst and will result in an increase in DOC outlet temperature. FIG. 3 is a graph 150 illustrating the time vs. temperature relationship at the ends of the DOC 22, where the vertical axis scale represents the change in temperature sensed between the sensors 28 and 30. A OBD misfire threshold 152 is shown, which is a predetermined temperature difference or delta between the temperatures sensed at sensors 28 and 30, above which the sensed temperature difference indicates that a misfire may have occurred. In some cases, the threshold delta 152 may be determined and change dynamically based on current engine conditions, such as the current engine load and engine speed; the engine system can determine the proper delta threshold for the current engine condition by monitoring relevant engine characteristics, such as engine speed, engine load, the DOC inlet temperature, and/or other characteristics, and set an appropriate threshold based on such characteristics. For example, a higher engine speed and a higher engine load (which causes more fuel to be injected) can provide a higher delta threshold. An example of a sensed temperature delta between sensors 28 and 30 remains relatively constant when a misfire does not occur, as shown by plotted line 154 in the graph. However, the sensed delta increases significantly when a misfire occurs, as shown by plotted line 156 in the graph, so that the temperature difference exceeds the OBD misfire threshold 152, as shown.

In next step 106, the process checks whether there has been an increase in the temperature delta measured at the DOC 22. In the described embodiment, this step checks whether the sensed temperature difference between the temperatures sensed at sensors 28 and 30 is above the OBD misfire threshold 152, as in the example shown in FIG. 3. If the temperature delta is not above the threshold, then the process returns to step 104. If the temperature is above the threshold, then the process continues to step 108.

The increase in temperature detected in steps 104 and 106 indicates that a cylinder may be misfiring, but does not pinpoint any particular cylinder that is or may be misfiring. Thus, after the misfire is detected, step 108 is initiated, in which the data sensed by the accelerometer 18 is analyzed for particular cylinders to determine which cylinder(s) are misfiring. The process can identify data corresponding to a particular cylinder since it is known when each particular cylinder normally fires during engine operation.

In the described embodiment, the accelerometer data can be evaluated by the process in step 108 in real-time as a waveform, without any need to record or store the data (except any storage needed for data comparisons or processing, as described below). In other embodiments, the accelerometer data can be recorded as sensed data (e.g. in step 104, or in step 108), so that over time a waveform is formed from stored datapoints and the waveform can be analyzed for cylinder misfires. For example, the data of the waveform can be stored in an electronic memory of the ECM 16 or other component of the engine system. In one alternate embodiment, the data from the accelerometer can start to be recorded only after a misfire is detected (a positive result in step 106), and is no longer recorded once the use of the data is complete in identifying currently-detected misfires.

Figure 4:
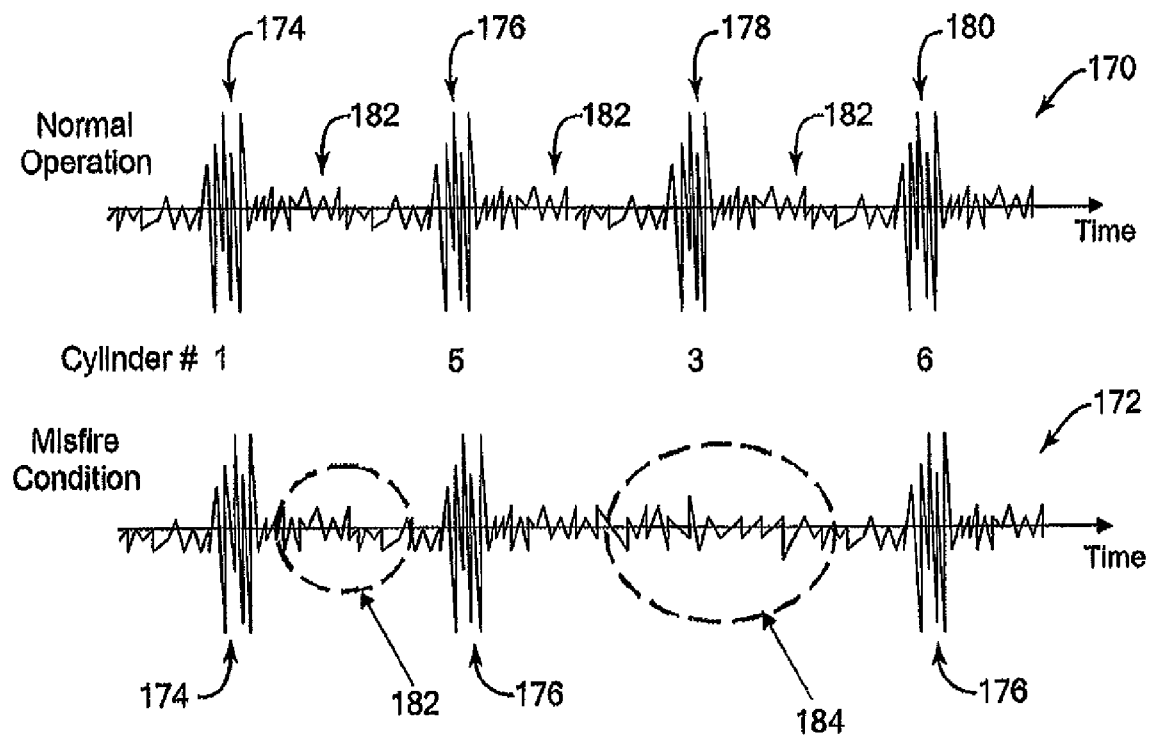
FIG. 4 is a graph diagram illustrating vibration waveforms for normal operation and misfire conditions in an engine.

FIG. 4 shows two graphs 170 and 172 illustrating accelerometer waveforms describing vibrations (amplitude) sensed over time by the accelerometer 18 in the engine 12. Graph 170 illustrates an accelerometer waveform for normal operation, when no misfires have occurred in any cylinders. When a cylinder fires (a combustion event), the waveform has a higher amplitude, shown by the signal pulse sections 174, 176, 178, and 180. Each pulse section corresponds to a particular cylinder of the engine 12, as indicated by the cylinder number labeled below each pulse section (additional cylinders can be sensed and waveform recorded over a longer time period in other embodiments). Between combustion events, a "quiet time" when no cylinders are firing, the waveform has a smaller amplitude, as shown in sections 182 of the waveform.

Graph 172 illustrates an accelerometer waveform for engine operation when a misfire occurs. At the combustion time when the signal pulse section 178 normally is sensed (as in graph 170), the accelerometer waveform shows a continued smaller amplitude in combustion section 184, which is similar in amplitude to the waveform portions 182 between combustion events. This is because the cylinder has misfired and the combustion event has not occurred. Thus the waveform indicates that the cylinder #3, which corresponds to the section 184, has misfired.

Referring back to FIG. 2, in step 108, the process analyzes the section of the waveform corresponding to a particular cylinder and compares that section to one or more of the quite time sections of the waveform located between cylinder firings. For example, the process could analyze the signal portion corresponding to the combustion of cylinder #3 in FIG. 4, which is the a section corresponding to the combustion section 184 of graph 172 of FIG. 4. This section is compared to a signal portion in a quiet section 182. The ratio of the combustion signal to the quiet signal is calculated (e.g., the combustion signal amplitude can be divided by the quiet signal amplitude), and the ratio is compared to a predetermined threshold. If the ratio is under the threshold, then it is known that the combustion section has a small amplitude, and that a misfire has occurred for that particular cylinder. If the ratio is over the threshold, then the signal amplitude is considered high enough to indicate a normal combustion event for that cylinder. In other embodiments, the sections of waveform are compared in other ways (instead of a ratio) to determine whether a combustion event has occurred, such as a peak-to-peak comparison of amplitudes of the combustion and quiet sections, or a power spectral density (PSD) determination to compare the energy in the vibrations between combustion and quiet sections.

In step 110, the process checks whether there is another cylinder to check for misfirings, and if so, returns to step 108 to analyze the sections of the waveform corresponding to a different cylinder to determine if that cylinder is misfiring, as described above. If there are no more cylinders to check in step 110 (e.g., all have already been checked), then in step 112 the process can provide results to a user based on manufacturer or user settings and preferences. For example, if there are one or more misfires, a user can be eventually notified, e.g., via an alarm, or using a Malfunction Indicator Lamp (MIL) ("check engine"light) or other indicator. In one embodiment, all cylinders can be tested multiple times before the MIL is illuminated, where the MIL is turned on only when a cylinder has misfired more than a predetermined threshold number of times. For example, the predetermined number of times can be a (calibrated) percentage of that cylinder's firings. Alternatively, a number of misfires and the cylinders which misfired can be stored in a memory of the ECM 16 (or other engine component) and this information provided to the user at a later time or after a predetermined time period. The process is then complete as indicated at 114. The process can then be started again at step 104, if appropriate.

The present invention allows efficient cylinder misfire detection in an engine. The invention allows calibration time and effort to be saved over previously-used misfire detection methods, since the misfire detection can be performed regardless of the configuration of the engine or vehicle. The present invention is also more robust than those methods, since both temperature and vibration sensing are used in misfire detection.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for detecting a cylinder misfire in an engine, the method comprising:
    monitoring a temperature in the exhaust of the engine, wherein the temperature is monitored at a catalyst, the catalyst coupled to the engine and receiving the exhaust from the engine; and
    examining vibration of the engine to identify a misfiring cylinder in the engine in response to the monitored temperature indicating a misfire may have occurred.

2. The method of claim 1 wherein the vibration of the engine is sensed using an accelerometer coupled to the engine.

3. The method of claim 1 wherein the monitored temperature is a temperature difference between a first temperature at an input of the catalyst and a second temperature at an output of the catalyst.

4. The method of claim 3 wherein the monitored temperature being above a predetermined threshold indicates a misfire may have occurred.

5. The method of claim 4 wherein the predetermined threshold is based on current engine characteristics, the current engine characteristics including a temperature at the input to the catalyst.

6. The method of claim 1 wherein examining the vibration of the engine includes examining data forming a waveform showing the vibration of the engine over time.

7. The method of claim 6 wherein examining the vibration of the engine includes examining a portion of the waveform corresponding to an expected combustion event of a cylinder of the engine, and comparing the portion to a different portion of the waveform corresponding to no combustion event of any cylinder of the engine.

8. The method of claim 7 wherein the comparing of the portion to a different portion includes determining a corresponding ratio of the portion amplitude divided by the different portion amplitude, wherein a misfiring cylinder is identified by the corresponding ratio being lower than a ratio similarly determined for a normally fifing cylinder of the engine.

9. The method of claim 7 wherein the examining of the portion of the waveform is repeated for different portions of the waveform corresponding to combustion events of different cylinders of the engine.

10. A system for detecting a cylinder misfire in an engine, the system comprising:
    one or more sensors operative to sense a temperature in the exhaust of the engine wherein the sensors sense the temperature at a catalyst, the catalyst coupled to the engine and receiving the exhaust from the engine;
    an accelerometer coupled to the engine and operative to detect vibration of the engine; and
    a controller operative to monitor the sensed temperature and to examine the vibration of the engine to identify a misfiring cylinder in the engine, wherein the controller examines the vibration in response to the monitored temperature indicating a misfire may have occurred.

11. The system of claim 10 wherein the temperature is monitored by the controller as a temperature difference between a first temperature sensed at an input of the catalyst by a first sensor and a second temperature sensed at an output of the catalyst by a second sensor.

12. The system of claim 10 wherein the monitored temperature being above a predetermined threshold indicates a misfire may have occurred, wherein the predetermined threshold is based on current engine characteristics, the current engine characteristics including a temperature at the input to the catalyst.

13. The system of claim 10 wherein the catalyst is included in a catalytic converter system that includes a soot filter.

14. The system of claim 10 wherein the controller examines the vibration of the engine by examining data forming a waveform showing the vibration of the engine over time.

15. The system of claim 14 wherein the controller examines a portion of the waveform corresponding to an expected combustion event of a cylinder of the engine, and compares the portion to a different portion of the waveform corresponding to no combustion event of any cylinder of the engine.

16. The system of claim 15 wherein the controller repeats the examining of a portion of the waveform for different portions of the waveform corresponding to combustion events of different cylinders of the engine.

17. The system of claim 15 wherein the controller comparing the portion to a different portion includes the controller determining a corresponding ratio of the portion amplitude divided by the different portion amplitude, wherein a misfiring cylinder is identified by the corresponding ratio being lower than a ratio similarly determined for a normally firing cylinder of the engine.

18. The system of claim 17 wherein each cylinder is examined multiple times and a warning is provided to indicate that a particular cylinder is misfiring when the particular cylinder has been determined to have misfired a predetermined number of times, wherein the predetermined number of times is a number over a threshold percentage of total cylinder firings.

19. An engine system comprising:
    an engine;
    one or more sensors operative to sense a temperature at a catalyst, the catalyst coupled to the engine and receiving the exhaust from the engine;
    an accelerometer coupled to the engine and operative to detect vibration of the engine and provide vibration data; and
    a controller operative to monitor the sensed temperature and to examine the vibration of the engine to identify a misfiring cylinder in the engine, wherein the controller is operative to examine the vibration in response to the monitored temperature indicating a misfire may have occurred, and wherein the examination includes examining a portion of the vibration data corresponding to an expected combustion event of a cylinder of the engine and comparing the portion to a different portion of the vibration data corresponding to no combustion event of any cylinder of the engine.

20. The engine system of claim 19 wherein the temperature is monitored by the controller as a temperature difference between a first temperature sensed at an input of the catalyst by a first sensor and a second temperature sensed at an output of the catalyst by a second sensor.

21. The engine system of claim 19 wherein the monitored temperature indicates a misfire may have occurred if the monitored temperature is above a predetermined threshold, wherein the predetermined threshold us based on current engine characteristics.

22. The engine system of claim 19 wherein the catalyst is included in a catalytic converter system that includes a soot filter.

23. A computer readable medium including program instructions to be implemented by a computer and for detecting a cylinder misfire in an engine, the program instructions for:

monitoring a temperature in the exhaust of the engine, wherein the temperature is monitored at a catalyst, the catalyst coupled to the engine and receiving the exhaust from the engine; and examining vibration of the engine to identify a misfiring cylinder in the engine in response to the monitored temperature indicating a misfire may have occurred.

24. The computer readable medium of claim 23 wherein examining the vibration of the engine includes:

examining data forming a waveform showing the vibration of the engine over time;

examining a portion of the waveform corresponding to an expected combustion event of a cylinder of the engine, and comparing the portion to a different portion of the waveform corresponding to no combustion event of any cylinder of the engine, wherein the comparing of the portion to a different portion includes determining a corresponding ratio of the portion amplitude divided by the different portion amplitude, wherein a misfiring cylinder is identified by the corresponding ratio being lower than a ratio similarly determined for a normally firing cylinder of the engine.

25. The computer readable medium of claim 23 wherein the monitored temperature is a temperature difference between a first temperature at an input of the catalyst and a second temperature at an output of the catalyst.

26. The computer readable medium of claim 25 wherein the monitored temperature being above a predetermined threshold indicates a misfire may have occurred, wherein the predetermined threshold is based on current engine characteristics, the current engine characteristics including a temperature at the input to the catalyst.

* * * * *